3,328,384
WATER-INSOLUBLE ACETOACETYLAMINO BENZIMIDAZOLONE MONOAZO DYESTUFFS
Erich Dietz, Kelkheim, Taunus, and Karl Schilling, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 9, 1964, Ser. No. 358,623
Claims priority, application Germany, Apr. 18, 1963, F 39,512
3 Claims. (Cl. 260—157)

The present invention provides new, valuable water-insoluble monoazo dyestuffs; more particularly, it relates to water-insoluble monoazo dyestuffs of the general formula

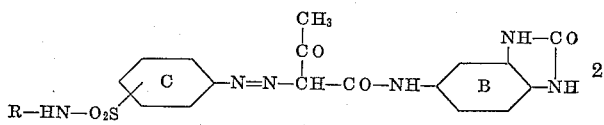

in which the group R—HN—$O_2$S— is in meta- or para-position to the azo group, R represents a hydrogen atom, an alkyl, hydroxyalkyl, alkenyl, aralkyl or cycloalkyl radical or an aryl radical which may be substituted by non-ionogenic radicals, and benzene nuclei B and C may be substituted by alkyl groups, alkoxy groups or halogen atoms.

The present invention is based on the observation that new, valuable water-insoluble monoazo dyestuffs can be prepared by coupling the diazonium compounds of amines of the general formula

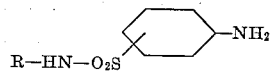

in which the group R—HN—$O_2$S— is in meta- or para-position to the amino group, R represents a hydrogen atom, an alkyl, hydroxyalkyl, alkenyl, cycloalkyl or aralkyl radical or an aryl radical which may be substituted by non-ionogenic radicals, and benzene nucleus C may be substituted by alkyl groups, alkoxy groups or halogen atoms, with the acetoacetyl compounds of 5-aminobenzimidazolones which may be substituted in the benzene nucleus of the benzimidazolone radical by alkyl or alkoxy groups or halogen atoms.

The monoazo dyestuffs obtained according to the proccess of the present invention may be prepared by combining the solution or suspension of the diazo compound with the coupling component present in a weakly acid medium in finely dispersed form or by adding the alkaline solution of the coupling component to the solution or suspension of the diazo component first introduced into the reaction vessel and adjusted to a pH-value of 5 to 6 by an addition of sodium acetate. Another possibility of carrying out the coupling is to add the solution or suspension of the diazo component and the alkaline solution of the coupling component simultaneously to a buffer mixture of sodium acetate and acetic acid. The coupling may be effected in the presence of anionic, cationic or non-ionogenic surface-active agents.

In order to attain the optimum grain structure of the pigments and to improve their fastness to solvents it is expedient, when the coupling is complete, to heat the dyestuff suspension for some time, possibly in the presence of small amounts of organic solvents such as methanol, ethanol, chlorobenzene, dichlorobenzene, dimethylformamide, pyridine or quinoline, if desired even to temperatures above 100° C. under pressure. Another kind of after-treatment consists in stirring the aqueous dyestuff press cake or the dried dyestuff for some time, possibly in the heat, in suitable organic solvents, for example methanol, ethanol, chlorobenzene, dichlorobenzene, formamide, dimethyl formamide, N-methyl acetamide, dimethyl sulfoxide or pyridine. According to the method of after-treatment applied a change in shade can be observed which is due to a change in th estructure of the crystals.

The new pigments are suitable for the preparation of printing colors and color lakes as well as for the dyeing of caoutchouc, natural resins and polymerization and condensation plastics. Moreover, the dyestuff prepared according to the process of the present invention may be used for the dyeing in the spinning mass and for the dyeing or printing according to the usual pigment dyeing or printing processes.

As compared with known monoazo dyestuffs of the acetoacetic anilide series which are not derived from the acetoacetyl compounds of the 5-aminobenzimidazolones, the new pigments are distinguished, in addition to a very good fastness to light and a very good resistance to weather, by an improved fastness to solvents, which is evident in all the properties connected with the fastness to solvents, as for example fastness to oil, overnpraying, overvarnishing, blooming and bleeding.

The following examples serve to illustrate the invention, but they are not intended to limit it thereto, the parts being by weight unless otherwise stated and the relationship of parts by weight to parts by volume being the same as that of the kilogram to the liter.

Example 1

21.6 parts of 1-amino-2-methoxybenzene-5 - sulfonic acid methyl amide are diazotized in 300 parts by volume of ice water and 60 parts by volume of 5 N-hydrochloric acid with 20 parts by volume of 5 N-sodium nitrite solution and the diazo solution is made up to 750 parts by volume by adding ice water.

Moreover, 24.5 parts of 5-acetoacetylamino-benzimidazolone are dissolved in 150 parts by volume of 2 N-sodium hydroxide solution and 600 parts by volume of water.

While stirring vigorously, the two solutions are simultaneously added, drop by drop, during about 30 minutes and at approximately the same speed to a buffer mixture consisting of 250 parts by volume of water, 100 parts by volume of 4 N-sodium acetate solution, 150 parts by volume of 2 N-acetic acid and 15 parts by volume of a 10% aqueous solution of the product obtained by reacting 1 mol of oleyl alcohol with 30 mols of ethylene oxide.

When the coupling is complete the mixture is heated for one hour to 90–95° C. by introducing steam, the dyestuff formed is filtered with suction, washed with water and dried.

There are obtained 46 parts of a reddish yellow pigment dyestuff, which is heated to the boil for one hour in 600 parts by volume of ethanol in order to improve its grain structure. It is then filtered with suction, washed with ethanol and dried. The pigment obtained has an excellent fastness to light as well as a very good fastness to solvents, overspraying and bleeding.

Example 2

26.2 parts of 1-amino-2-methylbenzene-5-sulfonic acid anilide are diazotized in 300 parts by volume of water and 60 parts by volume of 5 N-hydrochloric acid, at 0° C., with 20 parts by volume of 5 N-sodium nitrite solution. This diazo solution is added, while stirring rapidly, to an acetic suspension of the coupling component which has been prepared in the following manner: 24.5 parts of 5-acetoacetylamino-benzimidazolone are dissolved in 150 parts by volume of 2 N-sodium hydroxide solution, and the solution is diluted with 600 parts by volume of water. After having added 100 parts by volume of 4 N-sodium acetate solution and 25 parts by volume of a 5% aqueous solution of oleylamine acetate the coupling component is precipitated, while stirring vigorously, by adding 150 parts by volume of 2 N-acetic acid.

After having introduced the diazo solution, 30 parts by volume of pyridine are added and, when the coupling is complete, the mixture is heated for one hour to 90–95° C., by introducing steam. Subsequently, the dyestuff is filtered with suction, washed with water and dried.

The yield amounts to 50 parts of a reddish yellow pigment dyestuff having a very good fastness to light as well as a good fastness to solvents and migration.

*Example 3*

26 parts of 1-amino-2,5-dimethoxybenzene-4-sulfonic acid ethylamide are diazotized in 300 parts by volume of ice water and 60 parts by volume of 5 N-hydrochloric acid with 20 parts by volume of 5 N-sodium nitrite solution and the diazo solution is made up to 750 parts by volume by adding ice water.

Moreover, 24.5 parts of 5-acetoacetylamino-benzimidazolone are dissolved in 150 parts by volume of 2 N-sodium hydroxide solution and 600 parts by volume of water.

The two solutions are simultaneously introduced, drop by drop, while vigorously stirring, during about 30 minutes and at approximately the same speed, into a buffer mixture consisting of 250 parts by volume of water, 100 parts by volume of 4 N-sodium acetate solution, 150 parts by volume of 2 N-acetic acid and 15 parts by volume of a 10% aqueous solution of the product obtained by reacting 1 mol of oleyl alcohol with 10 mols of ethylene oxide.

When the coupling is complete the mixture is heated for one hour to 90–95° C. by introducing steam, the dyestuff formed is filtered with suction and washed with water. Subsequently, the moist dyestuff press cake is stirred with a small amount of water to yield a homogeneous paste, and after having added 100 parts by volume of ethanol the mixture is heated under pressure for 3 hours to 125–130° C. The product is then once more filtered with suction, washed quickly and dried. There are obtained 49 parts of a yellow pigment which has an excellent fastness to light as well as a very good fastness to solvents, overspraying and bleeding.

The following table indicates a number of further components suitable for being used in the process of the present invention as well as the tints of the monoazo dyestuffs prepared from these components.

| Diazo Component | Coupling Component | Tint |
| --- | --- | --- |
| 1-aminobenzene-3-sulfonic acid methylamide. | 5-acetoacetylamino-benzimidazolone. | Yellow. |
| 1-aminobenzene-4-sulfonic acid methylamide. | ____do____ | Do. |
| 1-amino-2-methylbenzene-5-sulfonic acid amide. | ____do____ | Reddish yellow. |
| 1-amino-2-methylbenzene-5-sulfonic acid methylamide. | ____do____ | Do. |
| 1-amino-2-methylbenzene-5-sulfonic acid benzylamide. | ____do____ | Do. |
| 1-amino-2-chlorobenzene-5-sulfonic acid amide. | ____do____ | Yellow. |
| 1-amino-2-chlorobenzene-5-sulfonic acid methylamide. | ____do____ | Do. |
| 1-amino-2-chlorobenzene-5-sulfonic acid anilide. | ____do____ | Do. |
| 1-amino-2-methoxybenzene-5-sulfonic acid ethylamide. | ____do____ | Reddish yellow. |
| 1-amino-2-methoxybenzene-5-sulfonic acid ethanolamide. | ____do____ | Do. |
| 1-amino-2-methoxybenzene-5-sulfonic acid-i-propylamide. | ____do____ | Do. |
| 1-amino-2-methoxybenzene-5-sulfonic acid-n-butylamide. | ____do____ | Do. |
| 1-amino-2-methoxybenzene-5-sulfonic acid benzylamide. | ____do____ | Do. |
| 1-amino-2-methoxybenzene-5-sulfonic acid cyclohexylamide. | ____do____ | Yellow. |
| 1-amino-2-methoxybenzene-5-sulfonic acid allylamide. | ____do____ | Reddish yellow. |
| 1-amino-2-methoxybenzene-5-sulfonic acid anilide. | ____do____ | Do. |
| 1-amino-2-methoxybenzene-5-sulfonic acid-2'-methylanilide. | ____do____ | Do. |
| 1-amino-2-methoxybenzene-5-sulfonic acid-4'-methylanilide. | ____do____ | Do. |
| 1-amino-2-methoxybenzene-5-sulfonic acid-2'-chloroanilide. | ____do____ | Do. |
| 1-amino-2-methoxybenzene-5-sulfonic acid-4'-chloroanilide. | ____do____ | Do. |
| 1-amino-2-methoxybenzene-5-sulfonic acid-3'-methoxyanilide. | ____do____ | Yellow. |
| 1-amino-2-methoxybenzene-5-sulfonic acid-4'-methoxyanilide. | ____do____ | Do. |
| 1-amino-2-methoxybenzene-5-sulfonic acid-2'-chloro-5'-methylanilide. | ____do____ | Reddish yellow. |
| 1-amino-2-methoxybenzene-5-sulfonic acid-2',5'-dichloroanilide. | ____do____ | Yellow. |
| 1-amino-2-methoxy-4-chlorobenzene-5-sulfonic acid ethylamide. | ____do____ | Do. |
| 1-amino-2-methoxy-4-methylbenzene-5-sulfonic acid ethanolamide. | ____do____ | Do. |
| 1-amino-4-chlorobenzene-5-sulfonic acid benzylamide. | ____do____ | Reddish yellow. |
| 1-amino-2,5-dimethoxybenzene-4-sulfonic acid amide. | ____do____ | Yellow. |
| 1-amino-2,5-dimethoxybenzene-4-sulfonic acid methylamide. | ____do____ | Do. |
| 1-amino-2,5-diethoxybenzene-4-sulfonic acid ethylamide. | ____do____ | Do. |
| 1-amino-2,5-dimethoxybenzene-4-sulfonic acid ethanolamide. | ____do____ | Do. |
| 1-amino-2,5-diethoxybenzene-4-sulfonic acid ethanolamide. | ____do____ | Do. |
| 1-amino-2,5-dimethoxybenzene-4-sulfonic acid-n-butylamide. | ____do____ | Do. |
| 1-amino-2,5-dimethoxybenzene-4-sulfonic acid allylamide. | ____do____ | Do. |
| 1-amino-2,5-dimethoxybenzene-4-sulfonic acid anilide. | ____do____ | Do. |
| 1-amino-2,5-dimethoxybenzene-4-sulfonic acid cyclohexylamide. | ____do____ | Do. |
| 1-amino-2,5-dimethoxybenzene-4-sulfonic acid 2'-methylanilide. | ____do____ | Do. |
| 1-amino-2,5-dimethoxybenzene-4-sulfonic acid 4'-chloroanilide. | ____do____ | Do. |
| 1-amino-2-methoxy-5-chlorobenzene-4-sulfonic acid methylamide. | ____do____ | Do. |
| 1-amino-2-methoxy-5-chlorobenzene-4-sulfonic acid ethanolamide. | ____do____ | Do. |
| 1-amino-2-methoxy-5-methylbenzene-4-sulfonic acid ethylamide. | ____do____ | Do. |
| 1-amino-2-methoxy-5-methylbenzene-4-sulfonic acid benzylamide. | ____do____ | Do. |
| 1-amino-2,5-dichlorobenzene-4-sulfonic acid methylamide. | ____do____ | Do. |
| 1-aminobenzene-3-sulfonic acid amide. | 5-acetoacetylamino-6-chloro-benzimidazolone. | Do. |
| 1-aminobenzene-3-sulfonic acid ethylamide. | ____do____ | Do. |
| 1-amino-2-chlorobenzene-5-sulfonic acid amide. | ____do____ | Do. |
| 1-amino-2,5-dimethoxybenzene-4-sulfonic acid ethylamide. | ____do____ | Do. |
| 1-aminobenzene-3-sulfonic acid amide. | 5-acetoacetylamino-7-chloro-benzimidazolone. | Do. |
| 1-aminobenzene-3-sulfonic acid cyclohexylamide. | ____do____ | Do. |
| 1-amino-2-methylbenzene-5-sulfonic acid benzylamide. | ____do____ | Do. |
| 1-amino-2-methoxybenzene-5-sulfonic acid amide. | ____do____ | Do. |
| 1-amino-2-methoxybenzene-5-sulfonic acid anilide. | ____do____ | Do. |
| 1-amino-2-chlorobenzene-5-sulfonic acid amide. | ____do____ | Do. |
| 1-amino-2,5-dimethoxybenzene-4-sulfonic acid ethanolamide. | ____do____ | Do. |
| 1-amino-2,5-dimethoxybenzene-4-sulfonic acid anilide. | ____do____ | Do. |
| 1-amino-2-methoxybenzene-5-sulfonic acid amide. | 5-acetoacetylamino-7-bromo-benzimidazolone. | Do. |
| 1-amino-2-chlorobenzene-5-sulfonic acid amide. | 5-acetoacetylamino-6-methyl-benzimidazolone. | Do. |
| 1-amino-2-methoxybenzene-5-sulfonic acid allylamide. | ____do____ | Do. |
| 1-amino-2,5-dimethoxybenzene-4-sulfonic acid methylamide. | ____do____ | Do. |
| 1-amino-2,5-dimethoxybenzene-4-sulfonic acid ethanolamide. | ____do____ | Do. |

| Diazo Component | Coupling Component | Tint |
|---|---|---|
| 1-amino-2-methoxy-5-methyl-benzene-4-sulfonic acid ethylmide. | -----do----------------- | Do. |
| 1-aminobenzene-3-sulfonic acid amide. | 5-acetoacetylamino-7-methoxy-benzimidazolone. | Do. |
| 1-amino-2-methoxybenzene-5-sulfonic acid amide. | -----do----------------- | Do. |
| 1-amino-2-chlorobenzene-5-sulfonic acid amide. | -----do----------------- | Do. |
| 1-aminobenzene-3-sulfonic acid amide. | 5-acetoacetylamino-6-ethoxy-benzimidazolone. | Do. |
| 1-amino-2-chlorobenzene-5-sulfonic acid methylamide. | -----do----------------- | Do. |
| 1-amino-2-methoxybenzene-5-sulfonic acid acetyl amide. | 5-acetoacetylamino-benzimidazolone. | Reddish yellow. |
| 1-amino-2-methoxy-5-methyl-benzene-4-sulfonic acid methylamide. | -----do----------------- | Do. |

We claim:
1. A water-insoluble monoazo dyestuff of the formula

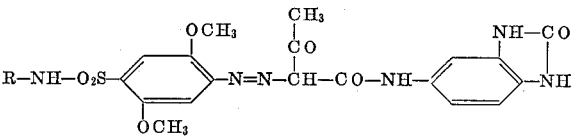

in which R represents methyl, ethyl or β-hydroxyethyl.

2. The water-insoluble monoazo-dyestuff of the formula

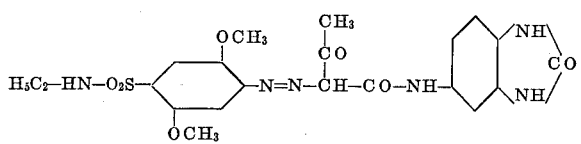

3. The water-insoluble monoazo-dyestuff of the formula

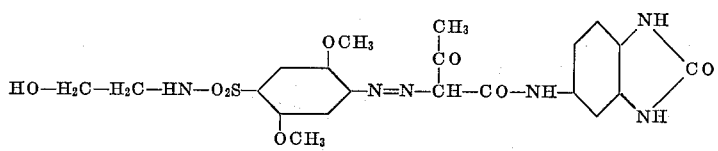

References Cited

UNITED STATES PATENTS 3,102,879   9/1963   Baumann et al. _____ 260—157
3,109,842  11/1963   Schilling et al. _____ 260—157

CHARLES B. PARKER, *Primary Examiner.*

FLOYD D. HIGEL, *Assistant Examiner.*